US006325927B1

(12) United States Patent
Green

(10) Patent No.: US 6,325,927 B1
(45) **Date of Patent: *Dec. 4, 2001**

(54) MAGNETIC SEPARATOR APPARATUS

(76) Inventor: Frederick H. Green, 22288 Kimberly Rd., Spring Hill, KS (US) 66083

( * ) Notice: Subject to any disclaimer, the term of this patent is extended or adjusted under 35 U.S.C. 154(b) by 0 days.

This patent is subject to a terminal disclaimer.

(21) Appl. No.: 09/612,817

(22) Filed: Jul. 10, 2000

Related U.S. Application Data

(63) Continuation-in-part of application No. 09/028,651, filed on Feb. 24, 1998, now Pat. No. 6,086,761.

(60) Provisional application No. 60/038,966, filed on Feb. 24, 1997.

(51) Int. Cl.[7] .................................................... B01D 35/06

(52) U.S. Cl. .......................... 210/222; 210/396; 210/400; 209/218; 209/226; 198/690.1

(58) Field of Search .................................... 210/222, 223, 210/296, 400; 209/218, 226; 198/690.1

(56) References Cited

U.S. PATENT DOCUMENTS

| | | | | |
|---|---|---|---|---|
| 4,370,228 | * | 1/1983 | Tashiro et al. | 210/400 |
| 6,086,761 | * | 7/2000 | Green | 210/222 |

* cited by examiner

*Primary Examiner*—David A. Reifsnyder
(74) *Attorney, Agent, or Firm*—Harrison & Egbert

(57) ABSTRACT

A magnetic separator apparatus having a configuration of barium ceramic magnets impregnated into polypropylene bars interspersed onto a conveyor belt which passes through an aqueous solution containing unwanted magnetic particulate. A plurality of spaced-apart magnet pairs embedded in each polypropylene bar are configured to provide maximum field penetration and holding strength of the magnets. Particulate attracted to the plurality of magnet pairs are scraped from the conveyor belt into a collection drawer.

10 Claims, 8 Drawing Sheets

MAGNETIC SEPARATOR APPARATUS

RELATED APPLICATIONS

This application is a continuation-in-part of application Ser. No. 09/028,651 filed Feb. 24, 1998 now U.S. Pat. No. 6,086,761 which claimed the benefit of U.S. provisional application Serial No. 60/038,966 filed Feb. 24, 1997.

BACKGROUND OF THE INVENTION

This invention relates generally to an apparatus used to clean an aqueous solution of unwanted particulate and more particularity relates to a magnetic separator apparatus used to clean an aqueous solution of unwanted magnetic particulate by using a conveyor chain with polypropylene bars having an unique configuration of barium ceramic magnets incorporated therein. This magnetic separator apparatus may be continuously run through the "dirty" solution. In particular, such an aqueous solution is used to clean car and truck bodies and other component parts prior to being immersed into zinc phosphate and zinc chromate baths used to coat the surfaces of these parts and assemblies.

There are many common methods and means used in the prior art to clean aqueous solutions of unwanted particulate. One traditional method is the insertion of magnetic rods directly into the aqueous solution. This type of cleansing or particulate-purging methodology, however, is flawed because of the necessity to frequently manually remove the rods having accumulated metal particulate deposited thereon. These rods must then be cleaned of unwanted particulate and then be inserted back into the aqueous solution. As can be appreciated by those skilled in the art, this cleaning methodology is time-consuming and labor-intensive. It will be understood that another flaw found in this prior art methodology is that the effectiveness of the magnets used to purge dirt and the like from the solution is greatly diminished as such magnetic dirt builds up on the rods.

Another type of methodology known in the art that is used to clean aqueous solutions of unwanted particulate is the passage through the solution of a stainless steel conveyor belt impregnated with magnets. This type of conveyor belt based cleaning, however, does not adequately and efficiently purge the aqueous solution of all unwanted particulate. That is, such a cleaning process is typically not efficient because the effectiveness of the magnets is drastically reduced by the total encasement of the magnets in the stainless steel conveyor belt. Accordingly, this type of design tends to reduce the strength of the magnetic fields emanating from the impregnated magnets.

For instance, in U.S. Pat. No. 4,055,497, Creps et al. teach a hold-down mechanism for scraper conveyor foruse in a settling tank having a flat bottom, an inclined side extending from an arcuate corner along side of bottom, and a drag-out conveyor means along bottom and up the inclined side. This mechanism is used for the removal of solids from liquids such as cuttings in coolants. Toshiro et al., in U.S. Pat. No. 4,370,228, disclose a magnetic belt conveyor for magnetic particle separation in a storage tank. A magnet is disposed beneath the forward run of the belt conveyor to extend in the direction of running thereof. In U.S. Pat. No. 3,834,542, Linsruth teaches a magnetic separator conveyor that uses a plurality of spaced magnets carried on an endless chain drive to magnetically clean a liquid solution from ferrous particulate. The prior art, has generally been unable to provide an apparatus having a effectively configured and sufficiently sustained magnetic field to enable magnetic particulate from being completely purged from dirty solutions.

Accordingly, these limitations and disadvantages of the prior art are overcome with the present invention, and improved means and techniques are provided which are useful for cleaning an aqueous solution of unwanted magnetic particulate and the like.

SUMMARY OF THE INVENTION

The present invention provides an improved magnetic separator apparatus which overcomes deficiencies in the prior magnetic separator art. As will be hereinafter described in detail, the present invention teaches a unique configuration of magnets impregnated into polypropylene bars. Under the present invention, barium ceramic magnets are embedded into polypropylene bars. The added strength of the barium ceramic and the unique configuration of the magnets optimize the field penetration and holding strength of the magnets.

It is an object of the present invention to provide an apparatus for continuously cleaning aqueous solutions containing unwanted magnetic particulate.

It is another object of the present invention to provide a magnetic separator apparatus for purging magnetic particulate from an aqueous solution.

It is still another object of the present invention to provide an apparatus for purging magnetic particulate materials from an aqueous solution without requiring human intervention to remove accumulated dirt from the magnetic separation means.

It is yet another object of the present invention to provide an apparatus for purging magnetic particulate materials from an aqueous solution while requiring only minimal maintenance attributable to accumulated dirt forming on the magnetic separation means.

It is an object of the present invention to provide a magnetic separation apparatus for cleaning magnetic particulate materials from an aqueous solution which engenders maximum reach of the magnetic field.

It is a specific object of the present invention to provide an apparatus for separating unwanted magnetic particulate from an aqueous solution, said apparatus comprising: a plurality of spaced-apart magnetic means disposed upon a conveyor belt means for attracting said magnetic particulate; each of said plurality of magnetic means constructed of polypropylene embedded with a like plurality of pairs of magnetic bars; said conveyor belt means disposed within said aqueous solution and configured for movement therethrough; and scraper means fixedly attached to said conveyor belt means for removing said particulate from said plurality of magnetic means for deposit into collection means.

It is another specific object of the present invention to provide an apparatus for separating unwanted magnetic particulate from an aqueous solution, said apparatus comprising: a plurality of uniformly spaced-apart magnetic means disposed upon a conveyor belt means disposed within said aqueous solution and configured for movement therethrough and for attracting said magnetic particulate; each of said plurality of magnetic means constructed of polypropylene embedded with a like plurality of pairs of magnetic bars with each of said pairs of magnetic bars having a first magnet means disposed abutably of a second magnet means with the outer surface of said first magnet means disposed abutably of first steel plate and the outer surface of said second magnet means disposed abutably of a second steel plate, with said first magnet means and said second magnet means sandwiched between said first and second steel plates, so that the South Pole of said first magnetic bar is aligned and contiguous with the South Pole of said second magnetic bar; and scraper means fixedly attached to said conveyor belt means for removing said particulate from said plurality of magnetic means for deposit into a collection means.

It is still another specific object of the present invention to provide an apparatus for separating unwanted magnetic particulate from an aqueous solution, said apparatus comprising: a plurality of uniformly spaced-apart magnetic means disposed upon a conveyor belt means disposed within said aqueous solution and configured for movement therethrough and for attracting said magnetic particulate; each of said plurality of magnetic means constructed of polypropylene embedded with a like plurality of pairs of magnetic bars with each of said pairs of magnetic bars having a first barium ceramic magnet means disposed abutably of a second barium ceramic magnet means with the outer surface of said first barium ceramic magnet means disposed abutably of first steel plate and the outer surface of said second barium ceramic magnet means disposed abutably of a second steel plate, with said first barium ceramic magnet means and said second barium ceramic magnet means sandwiched between said first and second steel plates, so that the South Pole of said first magnetic bar is aligned and contiguous with the South Pole of said second magnetic bar; and scraper means fixedly attached to said conveyor belt means for removing said particulate from said plurality of magnetic means for deposit into a collection means.

These and other objects and features of the present invention will become apparent from the following detailed description, wherein reference is made to the figures in the accompanying drawings with like numerals referring to like components.

IN THE DRAWINGS

DETAILED DESCRIPTION

Figure 1:
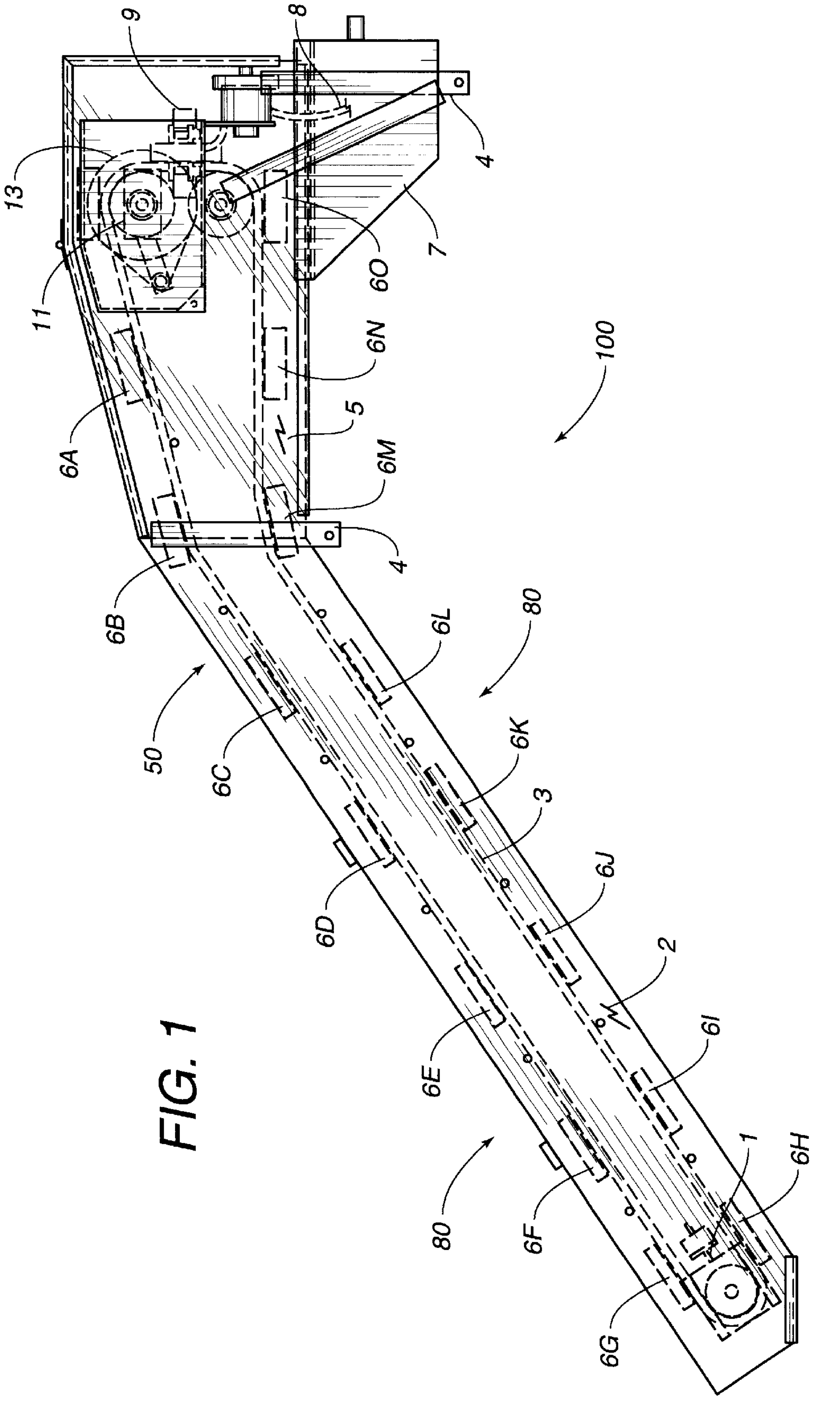
FIG. 1 depicts a right side elevation view of the preferred embodiment of the present invention.
Figure 2:
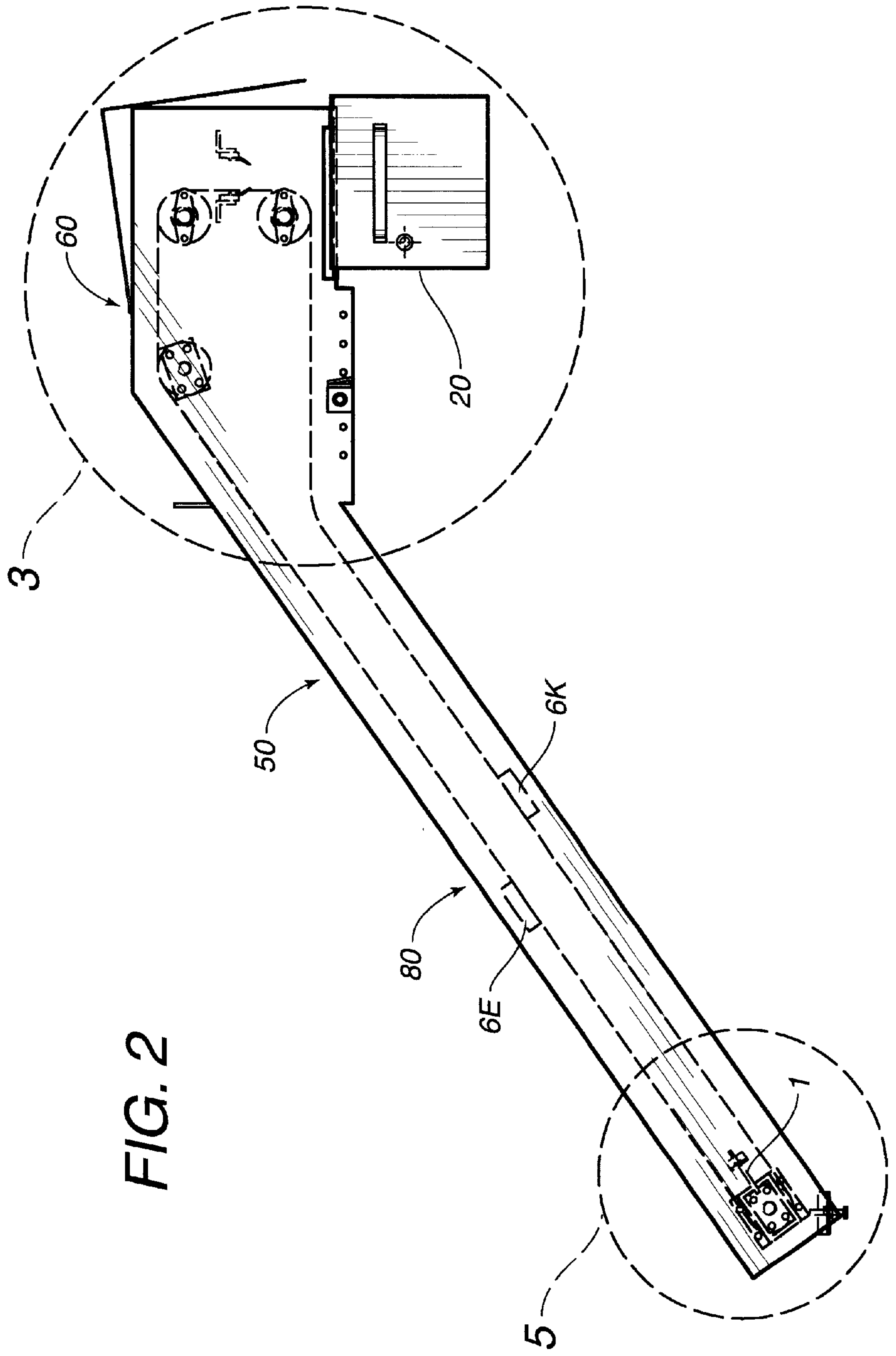
FIG. 2 depicts a right side elevation view of a portion of the preferred embodiment depicted in FIG. 1.
Figure 3:
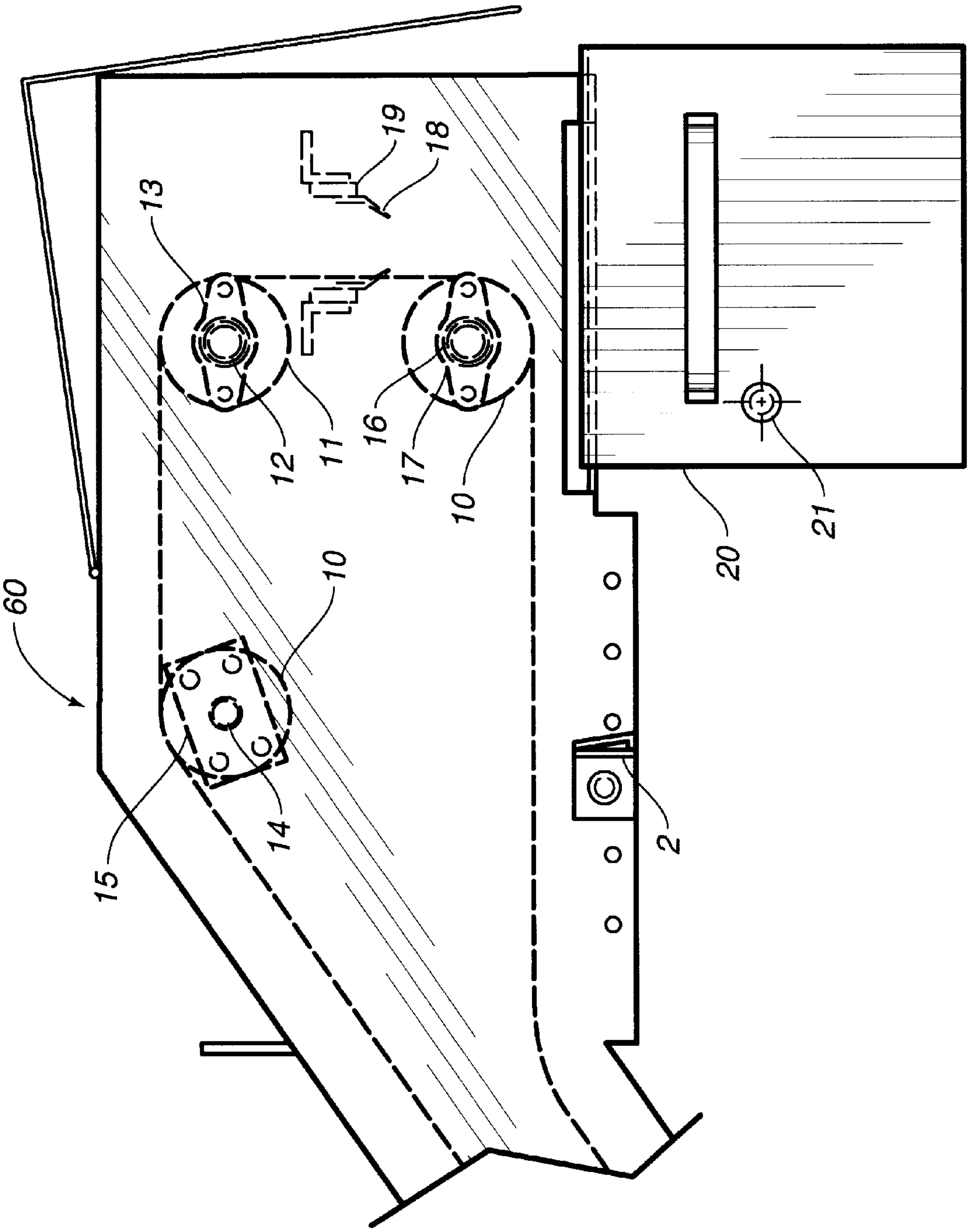
FIG. 3 depicts a right side isolated elevation view of a portion of the preferred embodiment depicted in FIG. 2.
Figure 4:
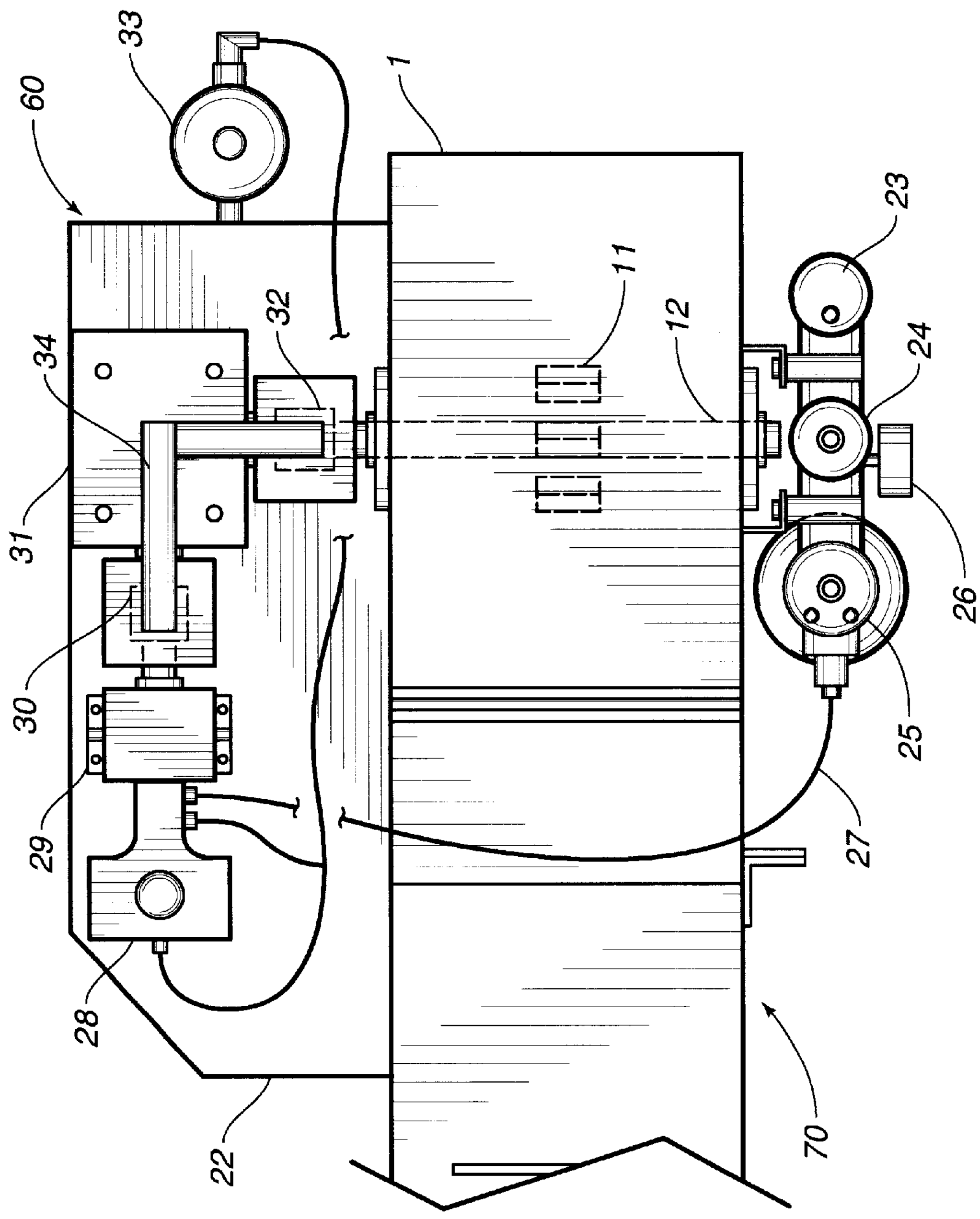
FIG. 4 depicts an isolated plan view of a portion of the preferred embodiment depicted in FIG. 2.
Figure 5:
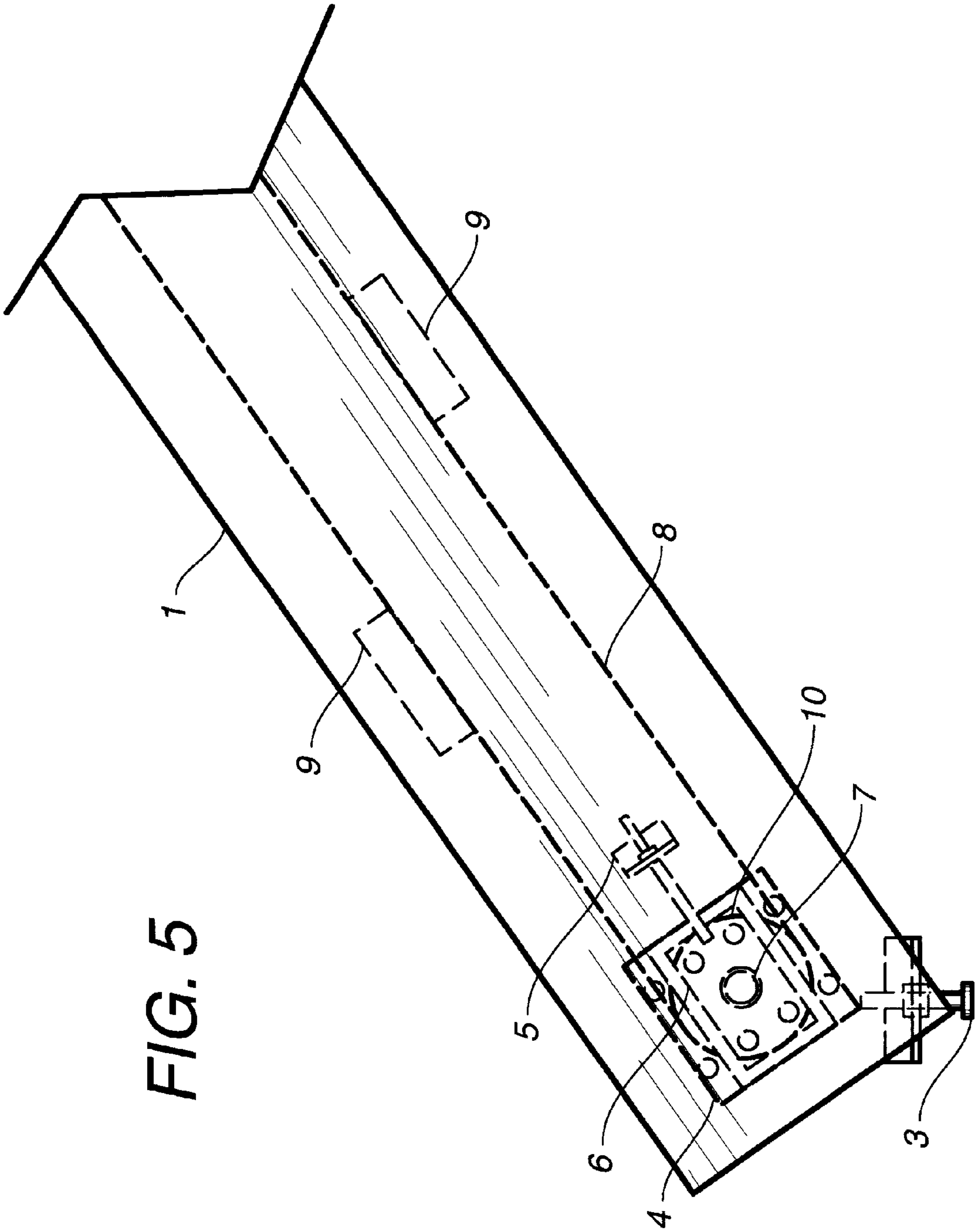
FIG. 5 depicts another right side isolated elevation view of a portion of the preferred embodiment depicted in FIG. 2.
Figure 6:
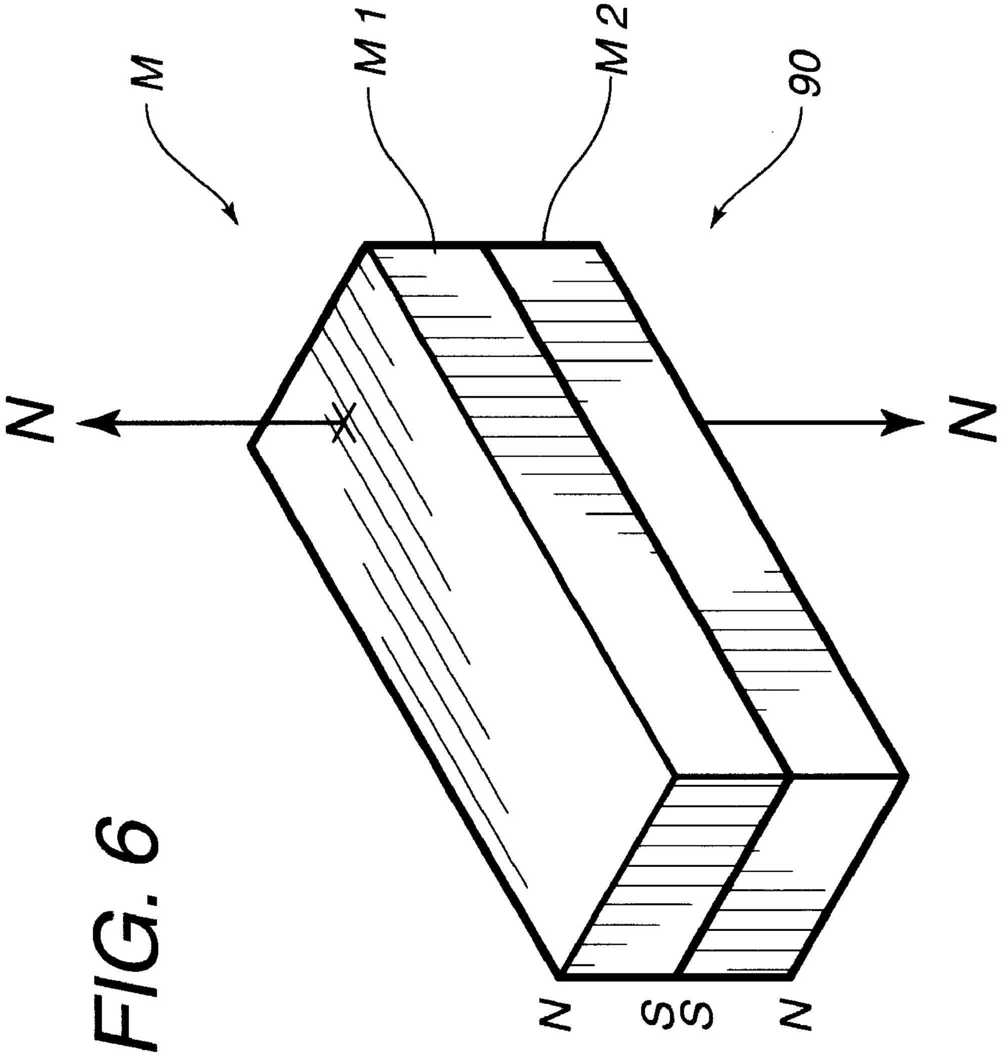
FIG. 6 depicts a simplified frontal perspective view of a pair of magnetic means under the present invention.

Referring now collectively to FIGS. 1–9, there is illustrated the preferred embodiment of a magnetic separator device of the present invention. Magnetic separator device 100 of the present invention consists of preferably stainless steel conveyor belt means 50 continuously moving through a vessel or storage tank (not shown) holding aqueous solution. It will be understood that U.S. Pat. No. 4,055,497 generally describes the state of the conveyor belt art applicable to a settling tank. Thus, conveyor belt means 50 passes through upper housing 60 and lower housing 70 in a manner well known in the art.

As will be hereinafter described, stainless steel conveyor belt means 50 should preferably consist of a plurality of spaced apart magnetic means 80 constructed of polypropylene impregnated with plurality of barium ceramic magnet means 90. Motor and concomitant gearbox 22 driving conveyor belt means 50 are located in upper housing 60. A conventional external power supply line provides the electrical or pneumatic power to drive motor 22. As will be appreciated by those skilled in the art, blade scraper assembly 19 containing plurality of scraper blade means 18 is also located in the interior of upper housing 60.

It will further be seen that preferred embodiment 100 comprises frame with lid 1, mounting clip means 2, adjustable bottom support means 3, bushing block cover means 4, tension adjustment clip means 5, plurality of spaced-apart magnetic block means 6A, B, C, D, . . . N, O idler shaft 7 and associated idler chain 8, magnetic block means 9, secondary sprocket means (including return, guide, and feed) 10, drive sprocket means 11 and associated drive shaft 12 and concomitant drive shaft bearings 13, guide shaft 14, guide shaft bushing block means 15, feed shaft 16 and associated feed shaft bearings 17, plurality of scraper blade means 18 and associated plurality of blade holder assemblies 19, scraper sludge collection drawer means 20, excess fluid drain plug means 21, motor and associated gearbox shelf 22, filter means 23, regulator 24, lubricator 25, pressure gauge 26, air or electric line kit 27 and associated air or electric motor 28, motor riser block 29, motor/reducer coupling means 30 and concomitant reducer gearbox 31, reducer/drive shaft coupling means 32, silencer/ reclassifier 33, and coupling guard assembly 34.

As will be evident to those skilled in the art, motor 22 drives conveyor belt means 50 magnets downwardly at an angle into the vessel holding the aqueous solution to be cleansed of metal particulate and the like. After passing through the solution, the metal particulate will naturally adhere to plurality of sections 6A, B, C, D, E, F, G, H, I, J, K, L, M, N, and O of conveyor belt means 50 having the magnet means taught by the present invention impregnated therein. The motor continues to drive conveyor belt means 50 and simultaneously drives the unwanted metal particulate up and out of the vessel towards upper housing 60. In a manner common in the art, plurality of scraping means 18 located in upper housing 60 then scrapes the accumulated metal particulate off the conveyor belt and into collection bin 20. Collection bin 20, of course, may be emptied at a later time whenever necessary.

It has been found that the infirmity of the prior art, wherein unwanted particulate deposits upon magnetic separation means adversely affect the separation capability thereof, may be effectively overcome by a combination of a novel arrangement and configuration of the magnetic separation means and by suitably coating this magnetic separation means. According to the preferred embodiment of the present invention, by impregnating conveyor belt means 50 with plurality of spaced-apart with permanent magnetic means 80 comprising barium ceramic material, separation of metal particulate contemplated hereunder may be accomplished with an efficiency heretofore unknown in the art.

Figure 7:
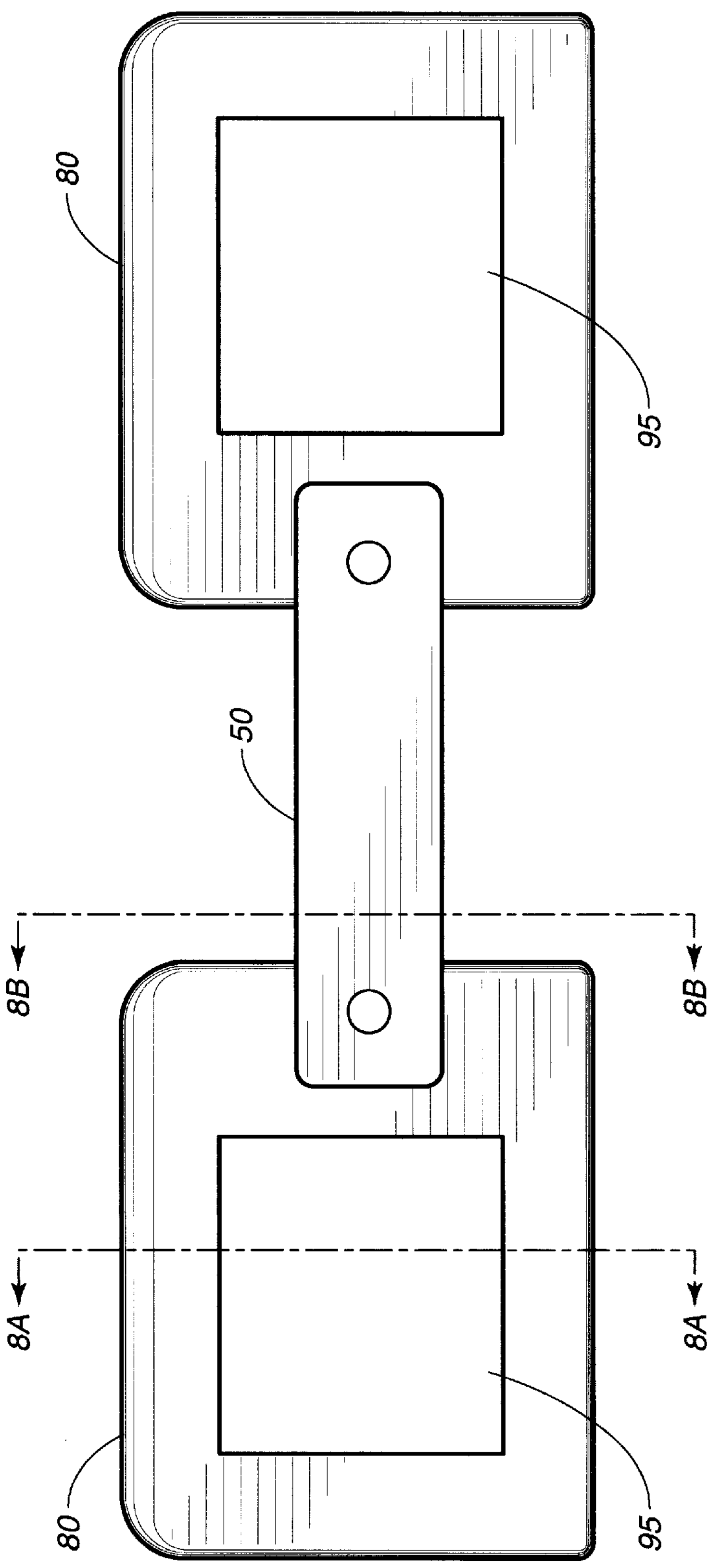
FIG. 7 depicts a frontal perspective view of the preferred embodiment of the magnetic means depicted in FIGS. 1–3.
Figure 8A:
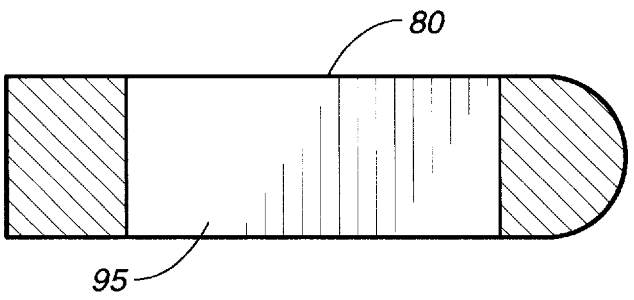
FIG. 8A depicts a cross-sectional side view of the preferred embodiment of the magnetic means depicted in FIG. 7 along line 8A–8A.
Figure 8B:
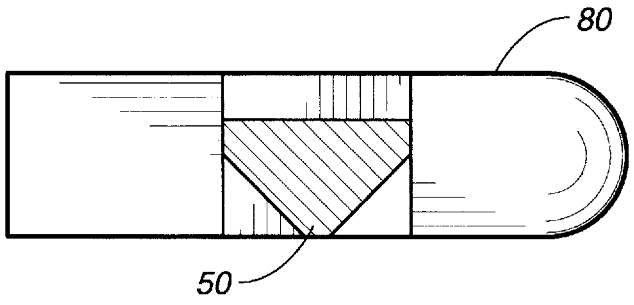
FIG. 8B depicts another cross-sectional side view of the preferred embodiment of the magnetic means depicted in FIG. 7 along line 8B–8B.

It will be understood that FIGS. 1–9 illustrated the unique configuration of the plurality of polypropylene bars 6A–O attached to stainless steel conveyor belt means 50. FIG. 7 specifically illustrates the configuration of the polypropylene bars which is impregnated with ceramic barium magnet means M, illustrated in FIG. 6. Barium ceramic magnet means M that is preferably embedded into open area 95 is clearly shown in FIG. 7. FIGS. 8A and 8B depicts the cross-sectional view of each of the plurality of polypropylene bars as-depict two cross-sectional side views of each of the plurality of polypropylene bars, along FIG. 7 lines 8A–8A and 8B–8B, respectively.

Figure 9:
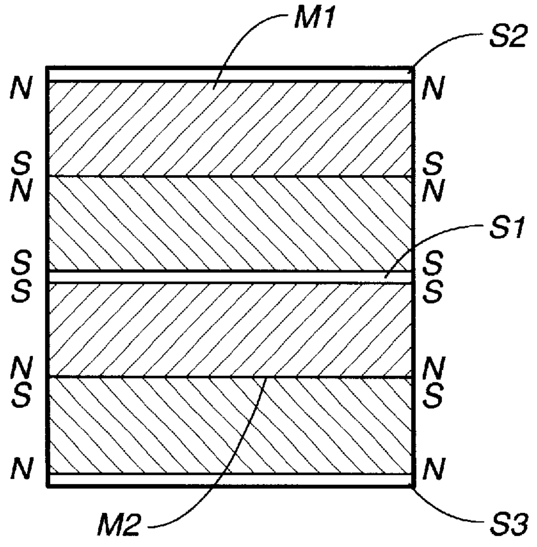
FIG. 9 depicts a cross-sectional side view of the plurality of barium ceramic magnets embedded into the polypropylene bars depicted in FIG. 6.

Referring now to FIG. 9, there is illustrated the configuration of pair of ceramic barium magnets, M1 and M2, separated by steel plate S1. As clearly shown, ceramic barium magnet M1 is disposed in a sandwich-like relationship between steel plates S1 and S2. Similarly, ceramic barium magnet M2 is sandwiched between steel plates S1 and S3. It will be appreciated that ceramic barium magnet M1 imparts magnetic configuration NORTH-SOUTH, NORTH-SOUTH; ceramic barium magnet M2 imparts magnetic configuration SOUTH-NORTH SOUTH-NORTH.

Thus, disposed between magnets M1 and M2 is steel plate means S1. On the outer edges of magnets M1 and M2 are steel plate means S2 and S3, respectively. As will be understood by those skilled in the art, this magnetic configuration creates a very strong South pole in the center looking for or seeking a North Pole. Due to the natural magnetic North Poles, two arcs are created, neither one of which is able to cause a complete magnetic field arc. Therefore, a unique scattered magnetic field is obtained by this configuration.

The unique configuration taught by the present invention, wherein magnetic means M is embedded into each of plurality of polypropylene bars 6A–O, increases the field strength or holding power of the barium ceramic magnets, M1 and M2, by twofold. It has been found that, for the configuration shown in FIGS. 6 and 9, a 10 inch field reach has been achieved at 1 Gauss unit. More particularly, for the preferred embodiment, M1 and M2, composed of two ⅜ inch tall by ¾ inch wide by 2 inches long barium ceramic magnets having the polarization normal to the ¾ inch wide surfaces, are forced together with the South Poles turned in. During testing, the field strength of this magnetic configuration was compared to the field strength of a conventional single ¾ inch tall by ¾ inch wide by 2 inches long solid barium ceramic magnet with poles normal to the ¾ inch surfaces. Both had very good field strength.

Similarly, the linear reaching power of these two test magnet configurations was tested. While the linear reaching power of the conventional single solid barium ceramic magnet was only eleven inches, the linear reaching power of the pair of barium ceramic magnets having the unique configuration taught by the present invention was 20 inches. Ergo, it will be appreciated that the magnetic pair of solid barium ceramic magnet means taught by the present invention delivers virtually double the linear reaching power of a conventional single similar magnet means.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. An apparatus for separating unwanted magnetic particulate from an aqueous solution, said apparatus comprising:

a plurality of spaced-apart magnetic means disposed upon a conveyor belt means for attracting said magnetic particulate;

each of said plurality of magnetic means constructed of polypropylene embedded with a like plurality of pairs of magnetic bars;

said conveyor belt means disposed within said aqueous solution and configured for movement therethrough; and scraper means fixedly attached to said conveyor belt means for removing said particulate from said plurality of magnetic means for deposit into collection means.

2. The apparatus recited in claim 1, wherein each of said pairs of magnetic bars comprises a first magnet means disposed abutably of a second magnet means with the outer surface of said first magnet means disposed abutably of a first steel plate and the outer surface of said second magnet means disposed abutably of a second steel plate, with said first magnet means and said second magnet means sandwiched between said first and second steel plates, so that the South Pole of said first magnetic bar is aligned and contiguous with the South Pole of said second magnetic bar.

3. The apparatus recited in claim 2, wherein said pairs of magnetic bars of said plurality of spaced-apart magnetic means are disposed uniformly upon said conveyor belt means.

4. The apparatus recited in claim 2, wherein the depth of each of said magnet means is the same as the depth of each of said steel plates.

5. The apparatus recited in claim 2, wherein said magnet means comprises barium ceramic material.

6. An apparatus for separating unwanted magnetic particulate from an aqueous solution, said apparatus comprising:

a plurality of uniformly spaced-apart magnetic means disposed upon a conveyor belt means disposed within said aqueous solution and configured for movement therethrough and for attracting said magnetic particulate;

each of said plurality of magnetic means constructed of polypropylene embedded with a like plurality of pairs of magnetic bars with each of said pairs of magnetic bars having a first magnet means disposed abutably of a second magnet means with the outer surface of said first magnet means disposed abutably of first steel plate and the outer surface of said second magnet means disposed abutably of a second steel plate, with said first magnet means and said second magnet means sandwiched between said first and second steel plates, so that the South Pole of said first magnetic bar is aligned and contiguous with the South Pole of said second magnetic bar; and scraper means fixedly attached to said conveyor belt means for removing said particulate from said plurality of magnetic means for deposit into a collection means.

7. The apparatus recited in claim 6, wherein the depth of each of said magnet means is the same as the depth of each of said steel plates.

8. The apparatus recited in claim 6, wherein said magnet means comprises barium ceramic material.

9. An apparatus for separating unwanted magnetic particulate from an aqueous solution, said apparatus comprising:

a plurality of uniformly spaced-apart magnetic means disposed upon a conveyor belt means disposed within said aqueous solution and configured for movement therethrough and for attracting said magnetic particulate;

each of said plurality of magnetic means constructed of polypropylene embedded with a like plurality of pairs of magnetic bars with each of said pairs of magnetic bars having a first barium ceramic magnet means disposed abutably of a second barium ceramic magnet means with the outer surface of said first barium ceramic magnet means disposed abutably of first steel plate and the outer surface of said second barium ceramic magnet means disposed abutably of a second steel plate, with said first barium ceramic magnet means and said second barium ceramic magnet means sandwiched between said first and second steel plates, so that the South Pole of said first magnetic bar is aligned and contiguous with the South Pole of said second magnetic bar; and scraper means fixedly attached to said conveyor belt means for removing said particulate from said plurality of magnetic means for deposit into a collection means.

10. The apparatus recited in claim 9, wherein the depth of each of said magnet means is the same as the depth of each of said steel plates.

* * * * *